United States Patent [19]
Gauer

[11] 3,912,207
[45] Oct. 14, 1975

[54] SHIPPING MOUNT AND SUSPENSION SYSTEM FOR APPLIANCE

[75] Inventor: Joseph August Gauer, Buchanan, Mich.

[73] Assignee: Whirlpool Corporation, Benton Harbor, Mich.

[22] Filed: July 30, 1974

[21] Appl. No.: 493,028

[52] U.S. Cl. .............................. 248/25; 248/188.4
[51] Int. Cl.² .................. B65D 19/40; F16F 15/06
[58] Field of Search ............ 248/25, 24, 20, 119 R, 248/188.4; 206/320

[56] References Cited
UNITED STATES PATENTS

| | | | |
|---|---|---|---|
| 2,407,014 | 9/1946 | Jones | 248/20 |
| 3,058,705 | 10/1962 | Hagg et al. | 248/20 |
| 3,198,324 | 8/1965 | Kallenbach et al. | 248/119 R X |
| 3,436,045 | 4/1969 | Anspaugh | 206/320 X |
| 3,464,309 | 9/1969 | Kilmarx | 85/36 |
| 3,516,629 | 6/1970 | Say | 248/20 |
| 3,572,218 | 3/1968 | Gumtow | 85/36 X |
| 3,575,288 | 4/1971 | Brucken | 206/320 |
| 3,596,234 | 7/1971 | Sapienza | 85/36 X |
| 3,673,911 | 7/1972 | Ramillon | 85/36 |
| 3,758,058 | 9/1973 | Neudeck | 248/119 R X |

*Primary Examiner*—J. Franklin Foss
*Attorney, Agent, or Firm*—Hill, Gross, Simpson, Van Santen, Steadman, Chiara & Simpson

[57] ABSTRACT

A combination shipping mount and spring suspension system for an appliance comprising at least one suspension assembly which includes a compression spring connected between upper and lower spring mounts. The lower spring mount extends through and is connected to the base of the appliance and the upper mount is connected to the suspended mechanism. The upper mount carries a clip means for releasably gripping a rod which extends through the center of the spring and lower mount such that upon compression of the spring the suspension is placed in a locked, hold-down state. The rod is carried by a member threadedly engaged into the lower mount and is released from engagement with the clip means upon rotation of the threaded member so that the suspension assembly is released to a free state. The threaded member carries a foot portion which is adapted for contacting a supporting surface and may be utilized as a leveling device for the appliance.

11 Claims, 6 Drawing Figures

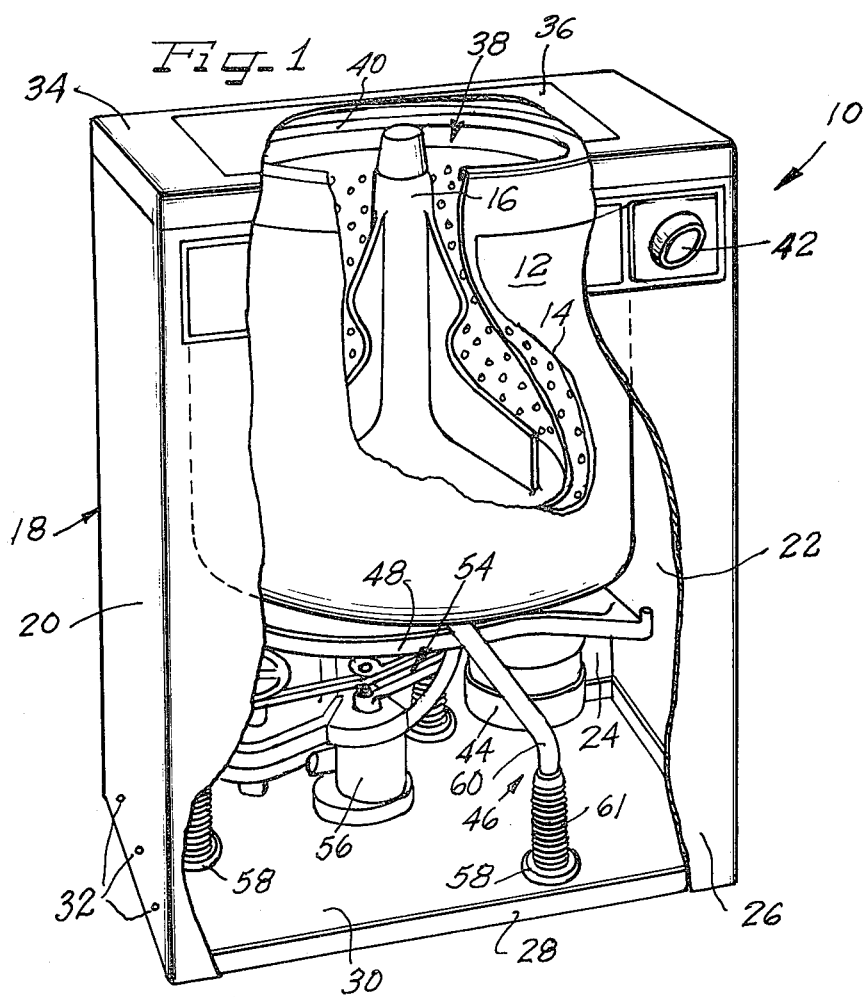
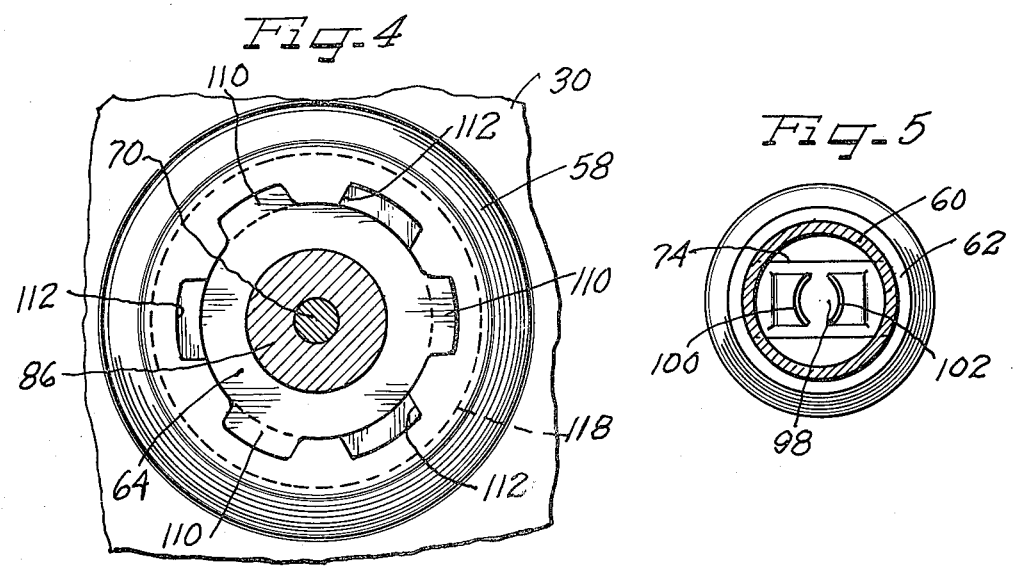

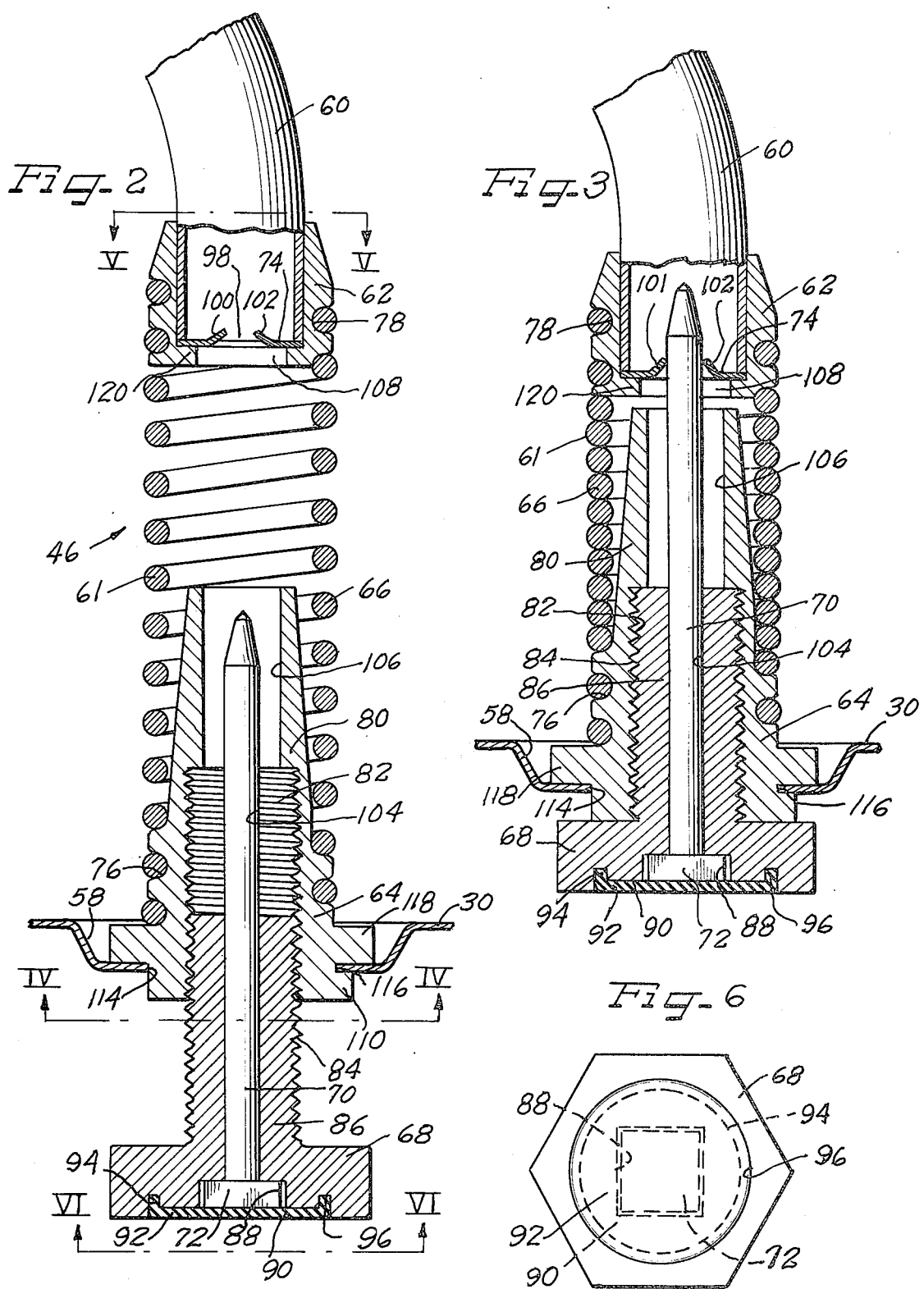

SHIPPING MOUNT AND SUSPENSION SYSTEM FOR APPLIANCE

BACKGROUND OF THE INVENTION

1. Field of the Invention

This invention relates to a spring suspension for an appliance, and is more particularly concerned with a self-leveling combination suspension and hold-down mechanism for an appliance.

2. Description of the Prior Art

It is well known in the art to provide a self-leveling foot to allow adjustment for, among other things, unevenness of a supporting surface upon which an appliance may stand. A completely level contact with the supporting surface is particularly important in an appliance, such as an automatic washer, where the motion of the machine components during operation creates a tendency for the machine to rock or to walk or move along the floor. Self-leveling devices are therefore frequently incorporated into the suspension apparatus of an appliance.

Appliances which have suspension apparatus are also generally provided with some type of hold-down or locking mechanism to prevent movement of the appliance within its shipping container or of the mechanism within the appliance cabinet in order to minimize the possibility of damage during transit. Such mechanisms generally incorporate means, such as, for example, a threaded rod and cooperable nut mechanism for compressing and holding compressed the suspension springs, and means for preventing a backing-off relative rotation of such parts during shipping as generally disclosed in U.S. Pat. Nos. 943,709; 2,407,014; 2,174,209; 3,198,324; 3,436,045; and 3,758,058.

A wide variety of other devices for providing some of the aforementioned self-leveling and hold down functions are also well known in the art. For example, reference may be made to the following U.S. Pat. Nos. 1,180,280; 2,289,514; 2,390,479; 2,868,484; and 3,346,221; 3,604,484; 3,758,058; and 3,759,471 for representative structures.

The prior art structures in this area, however, suffer from a number of drawbacks and disadvantages. First of all, the various structures are not universal, or at least are not universally adaptable for most applications, as in U.S. Pat. Nos. 2,126,6603 3,063,664 and 3,604,462 many of the hold-down mechanisms are not reusable as disclosed in U.S. Pat. No. 3,759,471. Thirdly, many of the hold-down mechanisms require the application of a great deal of force in compressing the suspension springs of an appliance and the compression method is rather slow and tedious when the compression must be effected by rotating a bolt, or a number of bolts, or the like. Finally, many of these structures do not lend themselves to a quick and easy release from the hold-down or shipping state.

SUMMARY OF THE INVENTION

The primary object of the present invention is to provide a hold-down or locking mechanism for the suspension of an appliance.

Another object of the invention is to provide a hold-down or locking mechanism for the suspension of an appliance which incorporates a self-leveling foot for contacting a supporting surface upon which the appliance may stand.

Another object of the invention is to provide a suspension and hold-down device which is easily adaptable to a wide variety of applications and which is quickly and easily locked for shipping, or released for appliance installation.

According to the invention, a shipping mount and suspension assembly mechanism for an appliance comprises a coil spring connected at opposite end portions between an upper mounting member and a lower mounting member. The upper mounting member is connected to the suspended mechanism of the appliance and the lower mounting member is connected to and extends through the base of the appliance. A threaded foot member extends upwardly through the lower mounting member and carries therein a polygonal nail having head disposed in a complemental recess in the bottom of the foot and held therein by a combination floor protector and retaining pad. A clip is mounted at the upper mounting member and includes an aperture defined by a pair of lanced-out lips which capture the shank of the nail as the spring is compressed. The lips of the clip define a thread which may have the same pitch as the threads of the foot so that as the foot is rotated out of the lower mounting member, the nail threads out of the clip and is released by the clip.

As will be understood from the following detailed description, the mechanism may be reused each time the appliance is shipped, and as will be appreciated from the description and the drawings herein, the mechanism is simple and easy to operate and is readily adaptable to a variety of suspension systems.

BRIEF DESCRIPTION OF THE DRAWINGS

Other objects, features and advantages of the invention, together with its organization, construction and operation will be best understood from the following detailed description of a preferred embodiment of the invention, taken in conjunction with the accompanying drawings, on which:

FIG. 1 is a perspective view of an automatic washing machine appliance, shown with portions thereof cut away and generally illustrating an embodiment of the invention;

FIG. 2 is a sectional view of an embodiment of the invention showing a suspension assembly in a free state;

FIG. 3 is a sectional view of the suspension assembly of FIG. 2 showing the assembly in an appliance hold-down or locked state;

FIG. 4 is a sectional view taken generally along the line IV—IV of FIG. 2;

FIG. 5 is a sectional view taken generally along the line V—V of FIG. 2; and

FIG. 6 is a bottom view of the self-leveling foot portion of the apparatus as viewed in the direction indicated by the line VI—VI in FIG. 2.

DESCRIPTION OF THE PREFERRED EMBODIMENT

Although the invention is illustrated and described herein with reference to an automatic washer, as mentioned above, it will be appreciated that this is by way of nonlimiting example and for purpose of illustration only.

Referring to FIG. 1, an automatic washing machine is generally referenced 10 and illustrating as comprising a tub 12 which has a perforate clothes container or spin basket 14 contained therein and an agitator 16 disposed within the spin basket and mounted for oscillatory movement with respect thereto and for spinning movement with the basket upon the centrifugal extraction of water from the clothes within the basket. The tub 12, the spin basket 14 and the agitator 16 and a drive mechanism therefore are enclosed in a cabinet 18.

The cabinet 18 is illustrated in FIG. 1 as being generally in the shape of a rectangular prism and having sidewalls 20 and 22, a backwall 24 and a front wall 26 detachably mounted on upright flanges 28 of a base 30, by, for example, screws 32. The screws 32 may be self-tapping screws of a conventional form and extend through the walls 20, 22 and 24 and the flanges 30 to detachably secure the cabinet 18 to the base 30.

The cabinet 18 also includes a top 34 having a hinged lid 36 which may be opened to afford access to a clothes receiving opening 38 in a tub ring 40 extending about the tub and over a corresponding opening in the spin basket 14. The cabinet 18 also includes a timer dial 42 connected to a timer (not shown) and mounted on the front wall 26 near the top of the cabinet beneath the top 34. Suitable wiring (not shown) connects the timer to a drive motor 44 and to other electrically operated components of the machine. The timer dial and the timer may be mounted in any desired location and are shown in the present location for illustrative purposes only.

Supported above the cabinet base 30 on vibration damping leg and suspension member assemblies 46 is a base plate 48 forming a support for the tub 12, spin basket 14 and the agitator 16, in a conventional manner. The base plate 48 also forms a support for the motor 44 and a drive control mechanism or transmission, generally indicated by the reference numeral 54, which may also include a clutch and control mechanism, as well as a drive mechanism for oscillating the agitator 16 or spinning the spin basket 14 and releasing the agitator to freely spin with the basket. A pump 56 is provided for removing wash or rinse water from the tub 12 at the termination of a washing or a rinsing operation and is supported by the base plate 48 and connected to drain the tub 12 through a drain hose (not shown). It should be understood that the motor 44, the drive mechanism 54 and the pump 56 can be mounted in any convenient manner between the cabinet base 30 and the base plate 48 and need not necessarily depend from the base plate 48 as shown.

Referring to FIGS. 2–6, each of the leg and suspension member assemblies 46 comprises a tubular leg or support 60 which is connected to the base plate 48; and a suspension member 61 including an upper mounting member 62 attached to the lower end of the tubular support 60, a lower mounting member 64 extending through and secured in a depression 58 of the base 30, a helical compression spring 66 connected at opposite end portions between the upper mounting member 62 and the lower mounting member 64, a threaded foot member 68 received in the lower mounting member 64 including a substantially flat contact surface for contacting an external supporting surface, rod means, here in the form of a nail 70, extending through the foot member 68 and the lower mounting member 64, and a spring clip 74 which is trapped between the bottom of the tubular support 60 and the upper mounting member 62.

More specifically, the lower mounting member 64 includes a helical groove 76 on its outer surface for threadedly receiving the lower end portion of the compression spring 66 and the upper mounting member 62 includes a similar helical groove 78 for threadedly receiving the compression spring 66. The lower mounting member 64 also includes an upwardly-extending portion 80 having a central bore 106 and an internally threaded surface portion 82 for receiving corresponding threads 84 of a portion 86 of the foot member 68.

The nail 70 includes a polygonal head portion here shown as a square head 72 which is disposed in a corresponding non-circular recess 88 in the bottom of the foot member 68. A recess 90 having a larger area than the recess 88 and a peripheral groove 96 receives a rubber pad 92 which includes an annular lip 94 corresponding to the peripheral groove 96. The pad 92 serves to hold the nail within the foot when the mechanism is not in its locked condition as well as protect the surface upon which the appliance is mounted.

Referring to FIGS. 2, 3 and 4, the lower mounting member 64 is twist-locked in the depression 58 in the base 30. For this purpose, the lower mounting member 64 may advantageously comprise a plurality of radially extending lugs 110 which are inserted through correspondingly disposed recesses 112 in the edge 114 of an aperture formed in the bottom of the recess 58. The member 64 is twisted so as to engage the edge 114 in a groove 116 formed in lower mounting member 64 between the lugs 110 and a circumferential flange 118.

With the lower mounting member 64 locked to the base 30 it is readily apparent that the foot 68 may be rotated to adjust the level of the appliance, and the nail 70 is held within the bore 104 and the recess 88 by the rubber pad 92, as illustrated in FIGS. 2, 3 and 6. Thus the nail 70 is restrained against movement relative to the lower mounting member 64, relative movement between the two being limited to a relative rotation caused by rotating the foot 68 with respect to the lower mounting member 64 and a consequent vertical linear movement of the nail relative to the lower mounting member.

The spring clip 74 is mounted between the lower end of the tube 60 and an inwardly directed flange 120 of the upper mounting member 62. The clip 74 includes an aperture 98 partially defined by a pair of inwardly and upwardly directed lips 100 and 102 which are somewhat resilient and which define a thread which may advantageously have a pitch which is the same as the pitch of the thread 84. In one particular construction, a spring clip with ten threads per inch for a ¼" bolt was employed with good results.

With the lower mounting member 64 twist-locked to the base of the appliance, the upper mounting member 62 secured to the suspended part of the appliance such as the tubular support 60, and opposite end portions of the spring 66 threaded onto the upper and lower mounting members as illustrated in FIG. 2, the spring is in a more or less free state and the appliance is supported for normal operation. In this state, the foot 68 may be raised or lowered, as necessary to support and level the machine. For shipping, the foot 68 is threaded completely into the lower mounting member 64, as illustrated in FIG. 3, and the spring 66 is fully compressed. The spring 66 may be compressed by applying a downward force on the base plate or other mechine components supported thereby. As the spring compresses, the shank of the rod means or nail 70 enters the aperture 98 of the clip 74 and is captured therein and prevented from moving in the opposite direction by the interference contact of the lips 100 and 102 with the shank of the nail 70. The nail 70, now captured by the clip 74, holds the spring 66 tightly compressed until, in preparing the appliance for use, the foot 68 is partially unthreaded from the lower mounting member. This action moves the foot downwardly to level the machine and, at the same time, rotates the nail 70 with respect to the clip 74, threading the nail out of the clip until the nail is finally released, thereby freeing the spring 66.

Upon release of the hold-down mechanism, the nail 70 need not be removed from the foot 68 and may be reused to lock the suspension if the machine is subsequently moved. This is accomplished by once again threading the foot completely back into the lower mounting member and forcing the spring to its completely compressed state so that the end of the nail is again captured by the clip.

In summary, a simple, yet effective, reusable suspension and hold-down mechanism has been provided which may be employed or adapted to a wide variety of uses. In addition, the hold-down mechanism integrally incorporates, and releases upon the operation of the hold-down mechanism, a leveling foot or the like which is normally provided on appliances.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

The embodiments of the invention in which an exclusive property or privilege is claimed are as follows:

1. A combined suspension and hold-down element for an appliance having a suspended tub assembly and a base, and designed to stand on a supporting surface, said suspension and hold-down element comprising:
   a suspension member having opposite first and second end portions and a free state and a fully compressed state, said suspension member connected between said suspended portion and said base of the appliance; rod means restrained relative to said first end portion and extending toward said second end portion of said suspension member;
   clip means associated with said second end portion of said suspension member for releasably gripping said rod means and responsive to relative rotation between said rod means and said clip means to release said rod means; and
   a foot member for supporting the appliance on a supporting surface, including means for selectively permitting the engagement of said rod means by said clip means and for selectively causing relative rotation between said rod means and said clip means,
   whereby the clip means is selectively caused to engage the rod means when the suspension member is forced to its compressed state, said suspension member being thereby locked in its compressed state until relative rotation occurs between said rod means and said clip means to release said rod means.

2. A combined suspension and hold-down element for an appliance designed to stand on a supporting surface, comprising:
   a suspension member with opposite end portions and having a free state and a fully compressed state, one of said end portions being adapted for attachment to the appliance and the other of said end portions adapted for contacting said supporting surface;
   rod means restrained relative to one of said end portions and extending toward the other of said end portions of said suspension element;
   clip means for releasably gripping said rod means and responsive to relative rotation between said rod means and said clip means to release said rod means; and
   rotatable means carried by one of said end portions for selectively permitting the engagement of said rod means by said clip means and for selectively causing a relative rotation between said rod means and said clip means,
   whereby the clip means is selectively caused to engage the rod means when the suspension member is forced to its compressed state, said suspension member being thereby locked in its compressed state until relative rotation occurs between said rod means and said clip means to release said rod means.

3. A combined suspension and hold-down element for connection between two parts of an appliance which are movable relative to each other, comprising:
   a spring member with opposite end portions and having a free and a fully compressed state; and
   fastening means for locking said spring member in the compressed state, said fastening means including
   a first mounting member having a first end portion for attachment to one of the parts of the appliance and a second end portion attached to one end portion of the spring member,
   a second mounting member having a first end portion attached to the other end portion of the spring and a second end portion for attachment to the other part of the appliance,
   rod means extending between the first and second mounting members and restrained against axial and rotary movement relative to said first mounting member, clip means mounted at the second of said mounting members for releasably gripping said rod means and responsive to rotation of said rod means relative to said clip means to release said rod means, and means for selectively permitting the engagement of said rod means by said clip means and for selectively rotating said rod means relative to said clip means to cause the releasing of said rod means,
   whereby the clip means is selectively caused to engage and grip the rod means when the spring member is forced to its compressed state, said spring member being thereby locked in its fully compressed state until said rod means is rotated relative to said clip means to release said rod means.

4. The combined suspension and hold-down element as claimed in claim 3 wherein
   said means for selectively permitting the engagement of said rod means by said clip means and for selectively causing a relative rotation between said rod means and said clip means to cause the releasing of said rod means includes a foot member for supporting the appliance;

said first mounting member has a hollow center portion extending axially along its length including a threaded lower portion for threadedly receiving said foot member;

said rod means includes a shaft portion extending from said foot member and also includes means for preventing the relative rotation between said shaft member and said foot member; and said clip means includes an apertured clip retained adjacent the second mounting member with said aperture facing said shaft portion of said rod means, the perimeter of said aperture including a lip portion defining a thread, whereby the rod member penetrates the aperture when the spring member is fully compressed and the foot member is fully threaded into the first mounting member, said lip portion gripping said rod member to lock said spring member in its fully compressed state, and the partial unthreading of said foot member from said first mounting member causes relative rotation between said rod member and said clip and the consequent unthreading and releasing of said rod member by said clip to release said spring member to its free state.

5. The combined suspension and hold-down element as claimed in claim 3, wherein said first and second mounting members each include a threaded portion and wherein said spring member includes a coil spring having its opposite end portions threadedly engaged with respective ones of said threaded portions of said first and second mounting members.

6. The combined suspension and hold-down element as claimed in claim 3, wherein said rod means comprises a shaft portion and said clip means includes an aperture for receiving said shaft portion in one direction along its longitudinal axis and lip means disposed in an interference relationship with said shaft portion to prevent non-rotating movement of said shaft in the opposite direction.

7. A combined suspension and hold-down element for connection between two parts of an appliance which are movable relative to each other, comprising:

a spring member with opposite end portions and having a free state and a fully compressed state; and fastening means for locking said spring member in the compressed state, said fastening means including a first mounting member having a first end portion for attachment to one of the parts of the appliance and a second end portion attached to one end portion of the spring member, a second mounting member having a first end portion attached to the other end portion of the spring and a second end portion for attachment to the other part of the appliance, rod means extending between the first and second mounting members and restrained relative to said first mounting member, clip means mounted at the second of said mounting members for releasably gripping said rod means and responsive to rotation of said rod means relative to said clip means to release said rod means, and means for selectively permitting the engagement of said rod means by said clip means and for selectively rotating said rod means relative to said clip means to cause the releasing of said rod means, said rod means including a non-circular head, the means for selectively permitting engagement of said rod means including an appliance supporting foot having a contact surface including means defining a non-circular recess in said supporting surface for receiving said head and means covering said recess to retain said head within said recess, whereby the clip means is selectively caused to engage and grip the rod means when the spring member is forced to its compressed state, said spring member being thereby locked in its fully compressed state until said rod means is rotated relative to said clip means to release said rod means.

8. A combined suspension and hold-down element for connection between two parts of an appliance which are movable relative to each other, comprising:

a spring member with opposite end portions and having a free state and a fully compressed state; and fastening means for locking said spring member in the compressed state, said fastening means including a first mounting member having a first end portion for attachment to one of the parts of the appliance and a second end portion attached to one end portion of the spring member, a second mounting member having a first end portion attached to the other end portion of the spring and the second end portion for attachment to the other part of the appliance, rod means extending between the first and second mounting members and restrained relative to said first mounting member, clip means mounted at the second of said mounting members for releasably gripping said rod means and responsive to rotation of said rod means relative to said clip means to release said rod means, and means for selectively permitting the engagement of said rod means by said clip means and for selectively rotating said rod means relative to said clip means to cause the releasing of said rod means, the means for selectively permitting engagement of said rod means including means defining a non-circular recess therein and said rod means including a non-circular head disposed in said non-circular recess, whereby the clip means is selectively caused to engage and grip the rod means when the spring member is forced to its compressed state, said spring member being thereby locked in its fully compressed state until said rod means is rotated relative to said clip means to release said rod means.

9. The combined suspension and hold-down element as claimed in claim 8, comprising means covering said non-circular recess to retain said rod means therein.

10. A combined suspension and hold-down element for an appliance including:

a spring member with opposite end portions and having a free and a fully compressed state; and fastening means for locking the spring member in the compressed state, said fastening means comprising:

a first mounting member having an upper end portion for attachment to the appliance and a lower end portion attached to one end portion of the spring member, a second mounting member having an upper end portion attached to the other end portion of the spring and a lower end portion, rod means extending between the first and second mounting members, clip means associated with said first mounting member for releasably gripping said rod means and responsive to relative rotation between said rod means and said clip means to release said rod means, and means for selectively permitting the engagement of said rod means by said clip means, for restraining said rod means against rotation and axial movement relative to said second mounting member, and for selectively rotating said rod means with respect to said clip means to cause the releasing of said rod means, whereby the clip means is selectively caused to engage and grip the rod means when the spring member is forced to its compressed state, said spring member being thereby locked in its fully compressed state until said rod means is rotated with respect to said clip means to release said rod means.

11. In an appliance of the type wherein a spring is connected between the frame of the appliance and a suspended part of the appliance to support the suspended part, and a hold-down device is provided to lock the spring in a compressed state for transport of the appliance, the improvement wherein the holddown device comprises:

rod means;

rotatable means connected to the frame and holding said rod means against movement toward the suspended part and against rotation relative said rotatable means; and clip means connected to the suspended part and including holding means for receiving said rod means and gripping said rod means against non-rotational movement away from the suspended part upon the application of a force on the suspended part to compress the spring, said holding means defining a helical path of movement of said rod means away from the suspended part upon rotation of said rotatable means.

* * * * *